United States Patent
Yui

(10) Patent No.: US 11,440,409 B2
(45) Date of Patent: Sep. 13, 2022

(54) VEHICLE SYSTEM AND HYBRID VEHICLE

(71) Applicant: HONDA MOTOR CO., LTD., Tokyo (JP)

(72) Inventor: Naoki Yui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 162 days.

(21) Appl. No.: 16/897,368

(22) Filed: Jun. 10, 2020

(65) Prior Publication Data

US 2020/0406748 A1     Dec. 31, 2020

(30) Foreign Application Priority Data

Jun. 26, 2019    (JP) .............................. JP2019-118985

(51) Int. Cl.
*B60K 35/00*          (2006.01)
*B60K 6/24*           (2007.10)
(Continued)

(52) U.S. Cl.
CPC ................ *B60K 35/00* (2013.01); *B60K 6/24* (2013.01); *B60K 6/26* (2013.01); *B60K 6/28* (2013.01);
(Continued)

(58) Field of Classification Search
CPC . B60K 35/00; B60K 6/24; B60K 6/26; B60K 6/28; B60L 58/15; B60L 58/12; B60L 58/26
See application file for complete search history.

(56) References Cited

U.S. PATENT DOCUMENTS

| | | | | |
|---|---|---|---|---|
| 5,433,970 A | * | 7/1995 | Wong ...................... | A23L 25/30 |
| | | | | 426/518 |
| 6,752,226 B2 | * | 6/2004 | Naito .................... | B60W 20/10 |
| | | | | 180/65.26 |

(Continued)

FOREIGN PATENT DOCUMENTS

| JP | 2008-074321 | 4/2008 |
|---|---|---|
| JP | 2008-137543 | 6/2008 |

(Continued)

OTHER PUBLICATIONS

Japanese Office Action for Japanese Patent Application No. 2019-118985 dated Mar. 25, 2022.

*Primary Examiner* — Hau V Phan
(74) *Attorney, Agent, or Firm* — Amin, Turocy & Watson, LLP

(57) ABSTRACT

A vehicle system is a vehicle system mountable in a hybrid vehicle, which includes an internal combustion engine, a rotary electric machine connected to an axle, and a storage battery for supplying electric power for traveling to the rotary electric machine, comprising: a display; a determiner configured to determine whether it is possible to switch from a first mode to a second mode on the basis of an SOC of the storage battery, the first mode being a mode in which electric power traveling of performing traveling by causing the rotary electric machine to drive only using electric power supplied by the storage battery, the second mode being a mode in which the electric power traveling is prioritized more than in the first mode; and a display controller configured to cause the display to display an image regarding whether switching to the second mode is possible.

8 Claims, 8 Drawing Sheets

(51) Int. Cl.
*B60K 6/26* (2007.10)
*B60K 6/28* (2007.10)
*B60L 58/12* (2019.01)
*B60L 58/26* (2019.01)

(52) U.S. Cl.
CPC ............ *B60L 58/12* (2019.02); *B60L 58/26* (2019.02); *B60K 2370/172* (2019.05); *B60K 2370/52* (2019.05); *B60Y 2200/92* (2013.01); *B60Y 2400/112* (2013.01); *B60Y 2400/43* (2013.01); *B60Y 2400/60* (2013.01)

(56) References Cited

U.S. PATENT DOCUMENTS

| | | | | |
|---|---|---|---|---|
| 8,676,414 | B2* | 3/2014 | Luo | B60W 10/26 701/22 |
| 9,440,643 | B1* | 9/2016 | Yamazaki | B60W 10/02 |
| 10,875,400 | B2* | 12/2020 | Yui | B60W 20/20 |
| 11,021,145 | B2* | 6/2021 | Yui | B60W 20/14 |
| 2009/0171522 | A1* | 7/2009 | Luo | B60W 10/08 701/22 |
| 2011/0082611 | A1* | 4/2011 | Shiba | B60L 58/15 701/22 |
| 2011/0246005 | A1* | 10/2011 | King | B60W 10/11 701/22 |
| 2013/0073129 | A1* | 3/2013 | Martin | B60L 50/40 701/22 |
| 2017/0136842 | A1* | 5/2017 | Anderson | B60G 17/0162 |
| 2018/0017430 | A1* | 1/2018 | Aghili | G01F 9/00 |
| 2018/0037219 | A1* | 2/2018 | Johri | B60W 10/08 |

FOREIGN PATENT DOCUMENTS

| | | |
|---|---|---|
| JP | 2009-113706 | 5/2009 |
| JP | 2011-230678 | 11/2011 |
| JP | 2013-119349 | 6/2013 |

* cited by examiner

VEHICLE SYSTEM AND HYBRID VEHICLE

CROSS-REFERENCE TO RELATED APPLICATION

This application claims priority to and the benefit from Japanese Patent Application No. 2019-118985, filed on Jun. 26, 2019, the contents of which are hereby incorporated by reference into the present application.

BACKGROUND

Field of the Invention

The present invention relates to a vehicle system and a hybrid vehicle.

Description of Related Art

Conventionally, there is a hybrid vehicle equipped with an engine and a motor including a first mode and a second mode in which opportunities for driving of an engine are limited more than in the first mode (for example, Japanese Unexamined Patent Application, First Publication No. 2013-119349, hereinafter, Patent Document 1). This hybrid vehicle includes a display device that displays whether switching to the second mode is possible when in the first mode.

In the display device disclosed in Patent Document 1 described above, switching to the second mode is possible when a remaining capacity of a battery is large, and switching to the second mode is not possible when the remaining capacity of a battery is small. However, even if the remaining capacity of a battery is not small, a situation in which deterioration of the battery is promoted due to other factors, and switching to the second mode becomes inappropriate may occur. For this reason, it may not be possible to notify the driver of whether switching to the appropriate second mode is possible, which is inconvenient for the driver.

The present invention has been made in consideration of such circumstances, and an object thereof is to provide a vehicle system and a hybrid vehicle that can improve convenience for a driver.

SUMMARY

A vehicle system according to the present invention has adopted the following configuration.

(1): A vehicle system according to one aspect of the present invention is a vehicle system mountable in a hybrid vehicle, which includes an internal combustion engine, a rotary electric machine connected to an axle, and a storage battery for supplying electric power for traveling to the rotary electric machine, comprising: a display; a determiner configured to determine whether it is possible to switch from a first mode to a second mode on the basis of a State Of Charge (SOC) of the storage battery and at least one of a temperature of the storage battery or a cooling water temperature, the first mode being a mode in which electric power traveling of performing traveling by causing the rotary electric machine to drive only using electric power supplied by the storage battery without causing the internal combustion engine to operate is shifted to engine operation traveling of performing traveling by causing the internal combustion engine to operate according to an increase of drive power, the second mode being a mode in which electric power traveling is prioritized more than in the first mode; a switcher configured to switch between the first mode and the second mode on the basis of an instruction of a driver and a determination result of the determiner; and a display controller configured to cause the display to display an image regarding whether switching to the second mode is possible.

(2): In the aspect of (1) described above, the determiner is configured to determine whether switching to the second mode is possible on the basis of a threshold value set in advance for the SOC, and the display controller is configured to cause the display to display an image in which the SOC of the storage battery and the threshold value can be recognized as an image regarding whether switching to the second mode is possible.

(3): In the aspect of (2) described above, the display controller is configured to cause the display to display an image in which the threshold value is represented in a switching portion of a display form in a graph in which the SOC is displayed.

(4): In the aspect of (2) described above, the determiner is configured to adjust the threshold value on the basis of at least one of a temperature of the storage battery or a cooling water temperature.

(5): In the aspect of (1) described above, the determiner is configured to sequentially determine whether switching to the second mode is possible on the basis of an SOC of the storage battery and at least one of a temperature of the storage battery or a cooling water temperature.

(6): In the aspect of (1) described above, the display controller is configured to cause the display to display the image regarding whether switching to the second mode is possible regardless of whether there is an instruction to switch to the second mode.

(7): In the aspect of (1) described above, in a case where switching to the second mode is not possible, the display controller is configured to cause the display to display an image indicating a reason why the switching is not possible.

(8): In the aspect of (7), described above the display controller is configured to cause the display to display the image indicating a reason why the switching is not possible in a case where there is an instruction to switch to the second mode and switching to the second mode is not possible.

(9): A hybrid vehicle according to another aspect of the present invention is a hybrid vehicle in which the vehicle system according to (1), the internal combustion engine, the rotary electric machine connected to the axle, and the storage battery that is configured to supply electric power for traveling to the rotary electric machine are mounted.

According to (1) to (9), it is possible to improve convenience for a driver.

According to (2) and (3), it is possible to make it easy for the driver to understand whether switching to an electric power priority mode is possible by using a simple display.

According to (4), it is possible to accurately determine whether switching to the electric power priority mode is possible.

According to (5), it is possible to notify the driver of whether switching to the electric power priority mode is possible all the time.

According to (6), it is possible to display whether switching to the electric power priority mode is possible regardless of an instruction of the driver.

According to (7), it is possible to allow the driver to easily understand a reason why switching to the electric power priority mode is not possible.

According to (8), it is possible to allow the driver to easily understand a reason why switching to the electric power priority mode is not possible using a simple display.

DETAILED DESCRIPTION OF THE INVENTION

Figure 1:
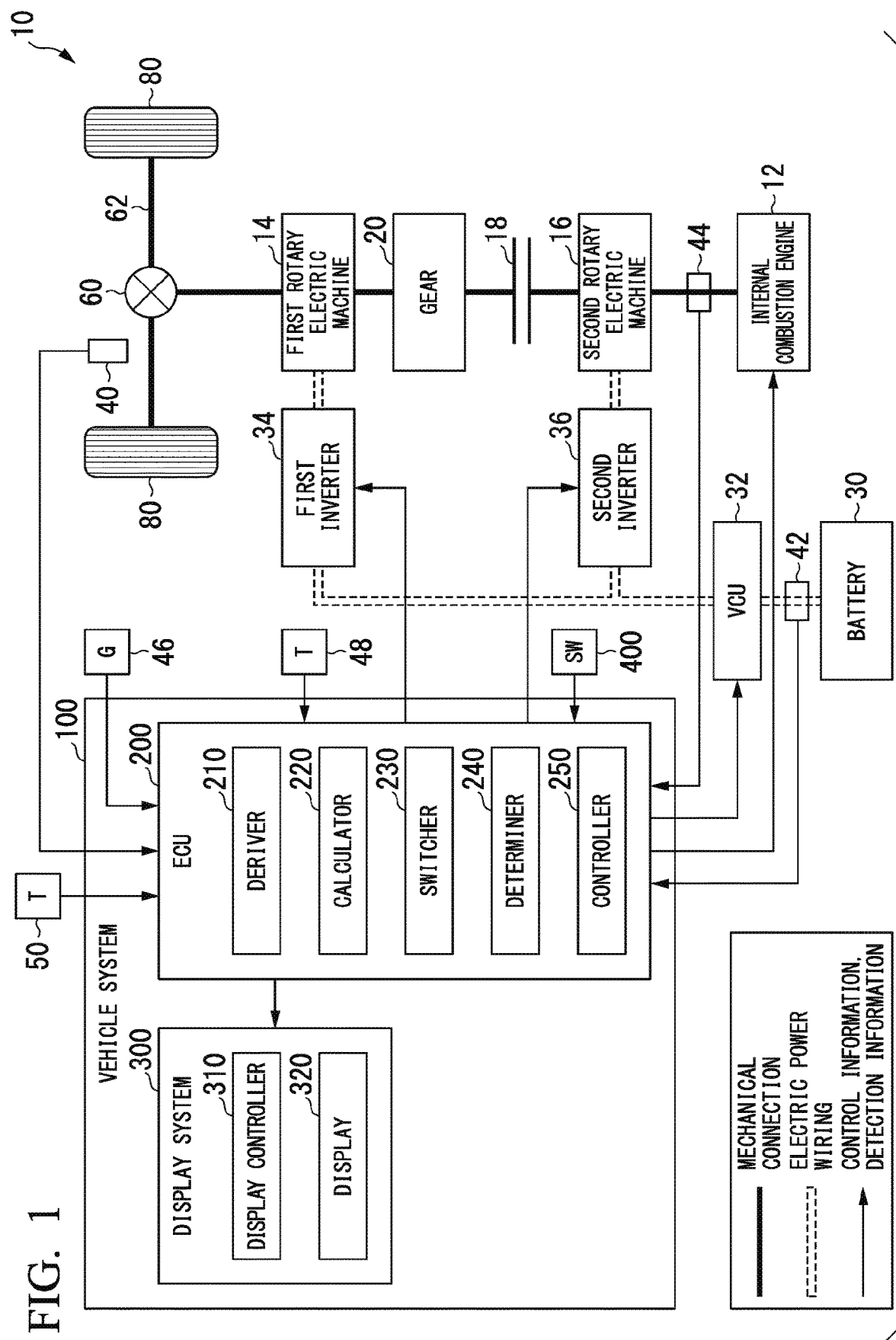
FIG. 1 is a configuration diagram which shows an example of a hybrid vehicle according to an embodiment.

Hereinafter, an embodiment of a vehicle system and a hybrid vehicle according to the present invention will be described with reference to the drawings. FIG. 1 is a configuration diagram which shows an example of a hybrid vehicle (hereinafter, an HV vehicle) 10 of the embodiment. The HV vehicle 10 includes a rotary electric machine and an internal combustion engine, and travels by drive power of the rotary electric machine and/or the internal combustion engine according to a traveling state of the vehicle. In general, the HV vehicle includes a series-type HV vehicle, a parallel-type HV vehicle, and a type of HV vehicle capable of switching between both of the types. The series-type HV vehicle travels by power of the rotary electric machine. On the other hand, the parallel-type HV vehicle travels by the drive power of one or both of the rotary electric machine and the internal combustion engine. The HV vehicle 10 is an HV vehicle which can switch a transmission system of the drive power to a configuration of one of the series-type and the parallel-type vehicles. The HV vehicle 10 may be one of the series type and the parallel type, and may also be an HV vehicle which cannot switch between them.

The HV vehicle 10 includes an internal combustion engine 12, a first rotary electric machine 14, a second rotary electric machine 16, a lock-up clutch (hereinafter, a clutch) 18, a gear box (hereinafter, a gear) 20, a battery 30, a voltage control unit (VCU) 32, a first inverter 34, a second inverter 36, a vehicle sensor 40, a battery sensor 42, a rotation speed sensor 44, an acceleration sensor 46, an indoor temperature sensor 48, an outdoor temperature sensor 50, a vehicle system 100, and a switching switch 400. The vehicle system 100 is mounted in the HV vehicle 10 and includes an electronic control unit (ECU) 200 and a display system 300. In FIG. 1, a thick solid line indicates a mechanical connection, a double dotted line indicates an electric power wiring, and a thin solid-line arrow indicates a control signal or a detection signal.

The internal combustion engine 12 drives the second rotary electric machine 16 as a generator with the clutch 18 disconnected. If the clutch 18 is engaged, power output by the internal combustion engine 12 is transmitted to drive wheels 80 and 80 via the second rotary electric machine 16, the clutch 18, the gear 20, the first rotary electric machine 14, a differential gear 60, and an axle 62 as mechanical energy for a traveling of the HV vehicle 10.

In the first rotary electric machine 14, a rotor operates, as an electric motor, by an electric power supply from at least one of the second rotary electric machine 16 and the battery 30, and generates power for the traveling of the HV vehicle 10. The first rotary electric machine 14 is connected to the differential gear 60 and the axle 62. Torque generated by the first rotary electric machine 14 is transmitted to the drive wheels 80 and 80 via the differential gear 60 and the axle 62. The first rotary electric machine 14 can operate as a generator at the time of braking of the vehicle. The second rotary electric machine 16 is driven by power of the internal combustion engine 12 and generates electric power.

The clutch 18 disconnects or engages a power transmission path from the internal combustion engine 12 to the drive wheels 80 and 80 according to an instruction from the ECU 200. The power output by the internal combustion engine 12 is not transmitted to the drive wheels 80 and 80 if the clutch 18 is in a disconnected state, and the power output by the internal combustion engine 12 is transmitted to the drive wheels 80 and 80 if the clutch 18 is in a connected state. The gear 20 includes a variable speed level or a fixed gear. The gear 20 shifts the power from the internal combustion engine 12 at a predetermined gear ratio, and transmits the power to the drive wheels 80 and 80. The gear ratio in the gear 20 is changed according to the instruction from the ECU 200.

The battery 30 has a plurality of storage cells connected in series, and supplies a high voltage of, for example, 100 to 400V. The storage cell is, for example, a lithium ion battery or a nickel hydride battery. The battery 30 is a storage battery (secondary battery) that supplies electric power for the traveling to the first rotary electric machine 14 such that the HV vehicle 10 may travel.

The VCU 32 boosts an output voltage of the battery 30 when the first rotary electric machine 14 operates as an electric motor. The VCU 32 lowers the output voltage of the first rotary electric machine 14 when the battery 30 is charged with regenerative electric power that is generated by the first rotary electric machine 14 and converted into a direct current at the time of braking the HV vehicle 10. The VCU 32 lowers a voltage of electric power that is generated by the second rotary electric machine 16 and converted into a direct current according to a drive of the internal combustion engine 12. The battery 30 is charged with the electric power whose voltage is lowered by the VCU 32.

The VCU 32 boosts a voltage on an output side to a voltage higher than the voltage output by the battery 30 by turning on or off two switching elements using the voltage output from the battery 30 as an input voltage. The voltage on an output side is equal to the voltage output from the battery 30 when two of the switching elements of the VCU 32 are not turned on or off.

The first inverter 34 converts a DC voltage to an AC voltage and supplies a three-phase current to the first rotary electric machine 14. The first inverter 34 converts an AC voltage generated by the first rotary electric machine 14 at the time of braking the HV vehicle 10 into a DC voltage. The second inverter 36 converts the AC voltage generated by the second rotary electric machine 16 into a DC voltage by the drive of the internal combustion engine 12.

The vehicle sensor 40 includes, for example, an accelerator opening sensor, a vehicle speed sensor, and a brake depression amount sensor. The accelerator opening sensor is attached to an accelerator pedal that receives an acceleration instruction by a driver, detects an operation amount of the accelerator pedal, and outputs the detected operation amount to the ECU 200 as an accelerator opening. The vehicle speed sensor includes, for example, a speed calculator and a wheel speed sensor attached to each wheel, derives a vehicle speed by integrating wheel speeds detected by the wheel speed sensors, and outputs the derived vehicle speed to the ECU 200. The brake depression amount sensor is attached to the brake pedal, detects an operation amount of the brake pedal, and outputs the detected operation amount to the ECU 200 as a brake depression amount.

The battery sensor 42 includes, for example, a current sensor, a voltage sensor, and a temperature sensor. The current sensor detects a current value of the battery 30. The voltage sensor detects a voltage value of the battery 30. The temperature sensor detects a temperature of the battery 30. The battery sensor 42 outputs the detected current value, voltage value, temperature value, and the like to the ECU 200.

The rotation speed sensor 44 detects a rotation speed of the internal combustion engine 12. The rotation speed sensor 44 outputs the detected rotation speed of the internal combustion engine 12 to the ECU 200. The acceleration sensor 46 detects an acceleration of the HV vehicle 10. The acceleration sensor 46 outputs the detected acceleration of the HV vehicle to the ECU 200.

The indoor temperature sensor 48 is, for example, provided in a vehicle compartment of the HV vehicle 10. The indoor temperature sensor 48 detects an indoor temperature of the HV vehicle 10. The indoor temperature sensor 48 outputs the detected indoor temperature to the ECU 200. The outdoor temperature sensor 50 is, for example, provided outside the vehicle compartment of the HV vehicle 10. The outdoor temperature sensor 50 detects an outdoor temperature of the HV vehicle 10. The outdoor temperature sensor 50 outputs the detected outdoor temperature to the ECU 200.

The ECU 200 includes a deriver 210, a calculator 220, a switcher 230, a determiner 240, and a controller 250. The deriver 210, the calculator 220, the switcher 230, the determiner 240, and the controller 250 are realized by, for example, a hardware processor such as a central processing unit (CPU) executing a program (software). Some or all of these components may be realized by hardware (circuit unit; including circuitry) such as large scale integration (LSI), an application specific integrated circuit (ASIC), a field-programmable gate array (FPGA), or a graphics processing unit (GPU), and may also be realized by cooperation of software and hardware. The program may be stored in a storage device (a non-transitory storage medium) such as a hard disk drive (HDD) or a flash memory in advance, and may also be stored in a detachable storage medium (non-transitory storage medium) such as a DVD or a CD-ROM and installed by the storage medium being mounted in the drive device.

The ECU 200 controls the VCU 32, the first inverter 34, and the second inverter 36 according to a state of the HV vehicle 10, and controls a disconnection or connection of the clutch 18 and driving of the internal combustion engine 12. The ECU 200 inputs and acquires battery information such as a current value, a voltage value, and a temperature of the battery 30 output by the battery sensor 42. The ECU 200 inputs and acquires the accelerator opening, the vehicle speed, and the brake depression amount output by the vehicle sensor 40. The ECU 200 inputs and acquires a rotation speed of the internal combustion engine 12 output by the rotation speed sensor 44 and a longitudinal acceleration of the HV vehicle 10 output by the acceleration sensor 46. The ECU 200 inputs and acquires the indoor temperature and the outdoor temperature output by the indoor temperature sensor 48 and the outdoor temperature sensor 50.

The deriver 210 derives a value indicating a required drive force for the HV vehicle 10 on the basis of the accelerator opening, the vehicle speed, and the brake depression amount output by the vehicle sensor 40. The deriver 210 outputs the derived required drive force to the switcher 230 and the controller 250.

The calculator 220 calculates a state of charge (hereinafter, referred to as SOC) of the battery 30, charging electric power input to the battery 30, and discharging electric power output from the battery 30 on the basis of the battery information output by the battery sensor 42. The calculator 220 outputs the calculated SOC of the battery 30 to the determiner 240 and the display controller 310. The calculator 220 outputs a value indicating the calculated charging electric power input to the battery 30 and a value indicating the calculated discharging electric power output from the battery 30 to the controller 250.

The switcher 230 selects and switches a traveling mode when a vehicle travels on the basis of the required drive force output by the deriver 210. The traveling mode typically includes an electric power traveling mode and an engine operation traveling mode. The electric power traveling mode is a mode in which the HV vehicle 10 travels by power of the first rotary electric machine 14 using only electric power supplied from the storage battery without opening the internal combustion engine. The engine operation traveling mode is a mode in which the HV vehicle 10 travels by operating the power of the internal combustion engine 12. The engine operation traveling mode includes a series traveling mode and an engine direct-coupled traveling mode. The series traveling mode is a mode in which the second rotary electric machine 16 is rotated by the driving of the internal combustion engine 12, and the first rotary electric machine 14 is driven together with the electric power supplied from the battery 30. The engine direct-coupled traveling mode is a mode in which the clutch 18 is engaged and a vehicle travels by the power output by the internal combustion engine 12. In the following description, a connection relationship of a clutch CL and transmission of power and electric power in each traveling mode will be described with reference to FIG. 2.

Figure 2:
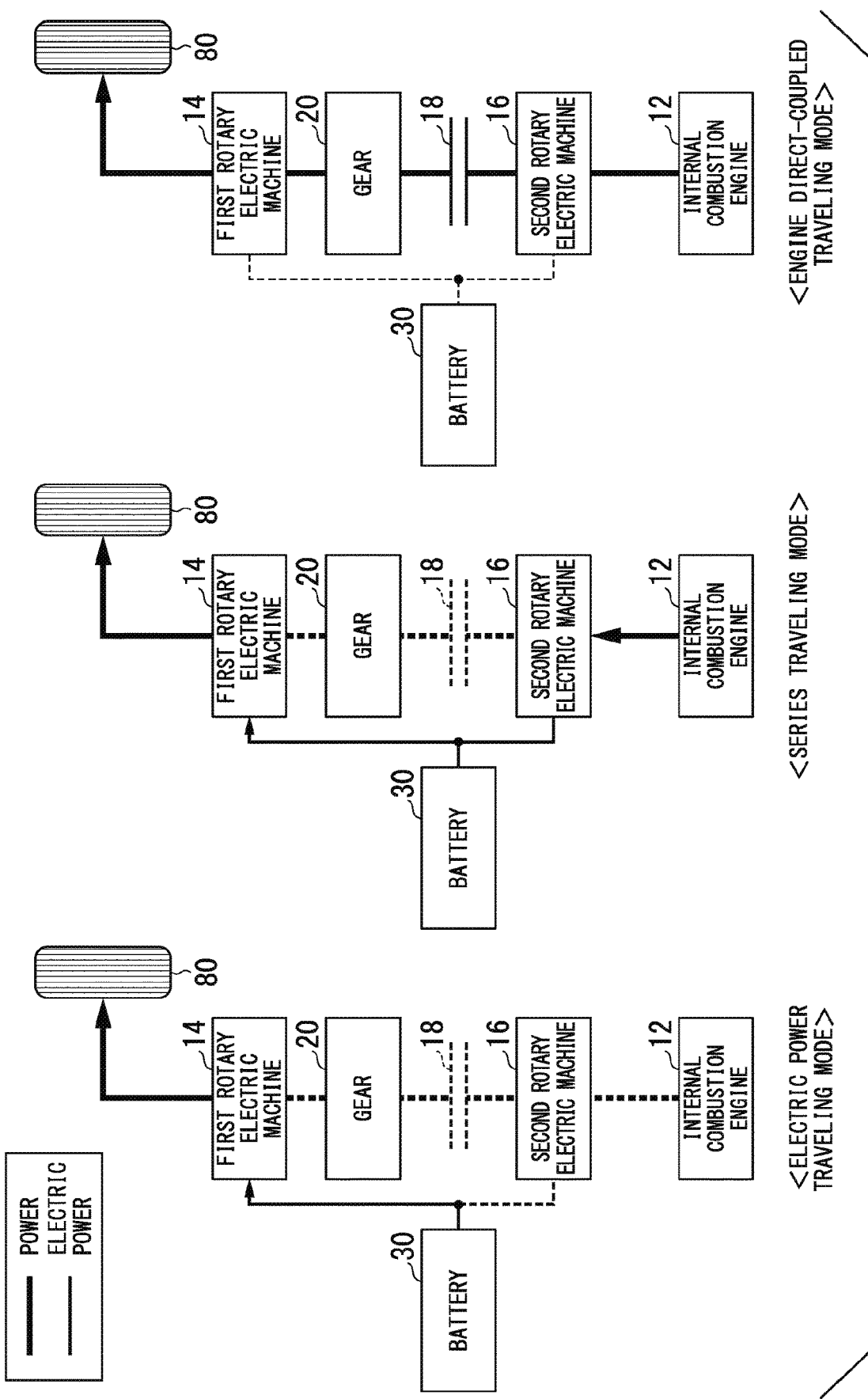
FIG. 2 is a diagram which shows an example of transmission of power and electric power in an HV vehicle set in each traveling mode.

As shown in FIG. 2, the clutch 18 is opened and the internal combustion engine 12 is stopped in the HV vehicle 10 set in the electric power traveling mode. The HV vehicle 10 set in the electric power traveling mode travels by the power of the first rotary electric machine 14 driven by the electric power supply from the battery 30.

The clutch 18 is opened and the internal combustion engine 12 drives in the HV vehicle 10 set in the series traveling mode. The HV vehicle 10 set in the series traveling mode travels by the electric power supply from the battery 30 and the power of the first rotary electric machine 14 to which electric power generated by the second rotary electric machine 16 is supplied by the driving of the internal combustion engine 12.

The clutch 18 is engaged and the internal combustion engine 12 drives in the HV vehicle 10 set in the engine direct-coupled traveling mode. The HV vehicle 10 set in the engine direct-coupled traveling mode travels by the power output by the internal combustion engine 12. When traveling in the engine direct-coupled traveling mode, respective rotors of the first rotary electric machine 14 and the second rotary electric machine 16 are rotated together with the drive of the internal combustion engine 12. The ECU 200 performs zero torque control such that the first rotary electric machine 14 and the second rotary electric machine 16 are in a no-load state.

The switcher 230 switches a selection mode that is a condition for selecting a traveling mode on the basis of an instruction of the driver. The selection mode includes a normal mode as a first mode and an electric power priority mode as a second mode. The normal mode is a mode that shifts from the electric power traveling mode to the engine operation traveling mode according to an increase of the required drive force. In the normal mode, a traveling mode of the HV vehicle 10 is switched from the electric power traveling mode to the engine operation traveling mode according to an increase of the drive power, and the traveling of the HV vehicle 10 is switched from electric power traveling of traveling only using electric power supplied from the battery 30 to engine operation traveling of traveling by operating the internal combustion engine 12. The electric power priority mode, like the normal mode, shifts from the electric power traveling mode to the engine operation traveling mode according to the increase of the required drive force, but gives priority to the electric power traveling mode than the normal mode. In the electric power priority mode, the electric power traveling is given priority as the traveling of the HV vehicle 10 over the normal mode.

For example, the switcher 230 sets the traveling mode to the engine operation traveling mode when the required drive force exceeds a predetermined first switching drive force, and sets the traveling mode to the electric power traveling mode when the required drive force is equal to or less than a predetermined second traveling switching drive force. The first switching drive force is drive power larger than the second switching drive force. For example, the switcher 230 sets the traveling mode to the electric power traveling mode when the required drive force exceeds the second switching drive force and equal to or less than the first switching drive force, and the selection mode is the electric power priority mode. The switcher 230, for example, sets the traveling mode to the engine operation traveling mode instead of the electric power traveling mode when the required drive force exceeds the second switching drive force and equal to or less than the first switching drive force, and the selection mode is the normal mode. The switcher 230 outputs the selected traveling mode to the controller 250 and the display system 300, and outputs the set selection mode to the display system 300.

The determiner 240 sequentially determines whether the selection mode can be set to the electric power priority mode on the basis of at least the SOC output by the calculator 220 and the temperature of the battery 30 output by the battery sensor 42. The determiner 240 sets a threshold value for the SOC of the battery 30 in determining whether the selection mode can be set to the electric power priority mode. The determiner 240 sets the threshold value for the SOC of the battery 30 in units of 10%. The determiner 240 may set the threshold value for the SOC of the battery 30 in units of other than 10%. When the SOC of the battery 30 output by the calculator 220 exceeds the set threshold value, the determiner 240 determines that the selection mode can be set to the electric power priority mode.

The determiner 240 adjusts the threshold value used for determining whether the selection mode can be set to the electric power priority mode on the basis of the temperature of the battery 30. The determiner 240 lowers the threshold value when the temperature of the battery 30 is high, and raises the threshold value when the temperature of the battery 30 is low. The determiner 240 outputs a set threshold value to the display controller 310. The determiner 240 may use an indoor temperature of the HV vehicle 10 output from the indoor temperature sensor 48 or an outdoor temperature of the HV vehicle 10 output by the outdoor temperature sensor 50, instead of or in addition to the temperature of the battery 30, to adjust the threshold value used for determining whether the selection mode can be set to the electric power priority mode. Alternatively, the calculator 220 may calculate a deterioration degree of the battery 30, and use the calculated deterioration degree of the battery 30 instead of or in addition to the temperature of the battery 30.

When it is determined that the selection mode can be set to the electric power priority mode, the determiner 240 outputs setting permission information to the switcher 230. The switcher 230 can set the selection mode to any one of the normal mode and the electric power priority mode when the setting permission information is output by the determiner 240. The switcher 230 can set the selection mode to the normal mode but cannot set the selection mode to the electric power priority mode when the setting permission information is not output by the determiner 240.

The controller 250 controls the internal combustion engine 12, the clutch 18, the first inverter 34, and the second inverter 36 on the basis of the traveling mode output by the switcher 230 and the required drive force output by the deriver 210.

The display controller 310 in the display system 300 causes the display 320 to display an image based on various types of information output by the ECU 200 and the like. For example, the display controller 310 causes the display 320 to display the SOC image based on the SOC of the battery 30 calculated by the calculator 220. The display controller 310 causes the display 320 to display a mode information image regarding the traveling mode and the selection mode of the HV vehicle 10 output by the switcher 230. The display controller 310 causes the display 320 to display a threshold value image relating to the threshold value output by the determiner 240.

Figure 3:
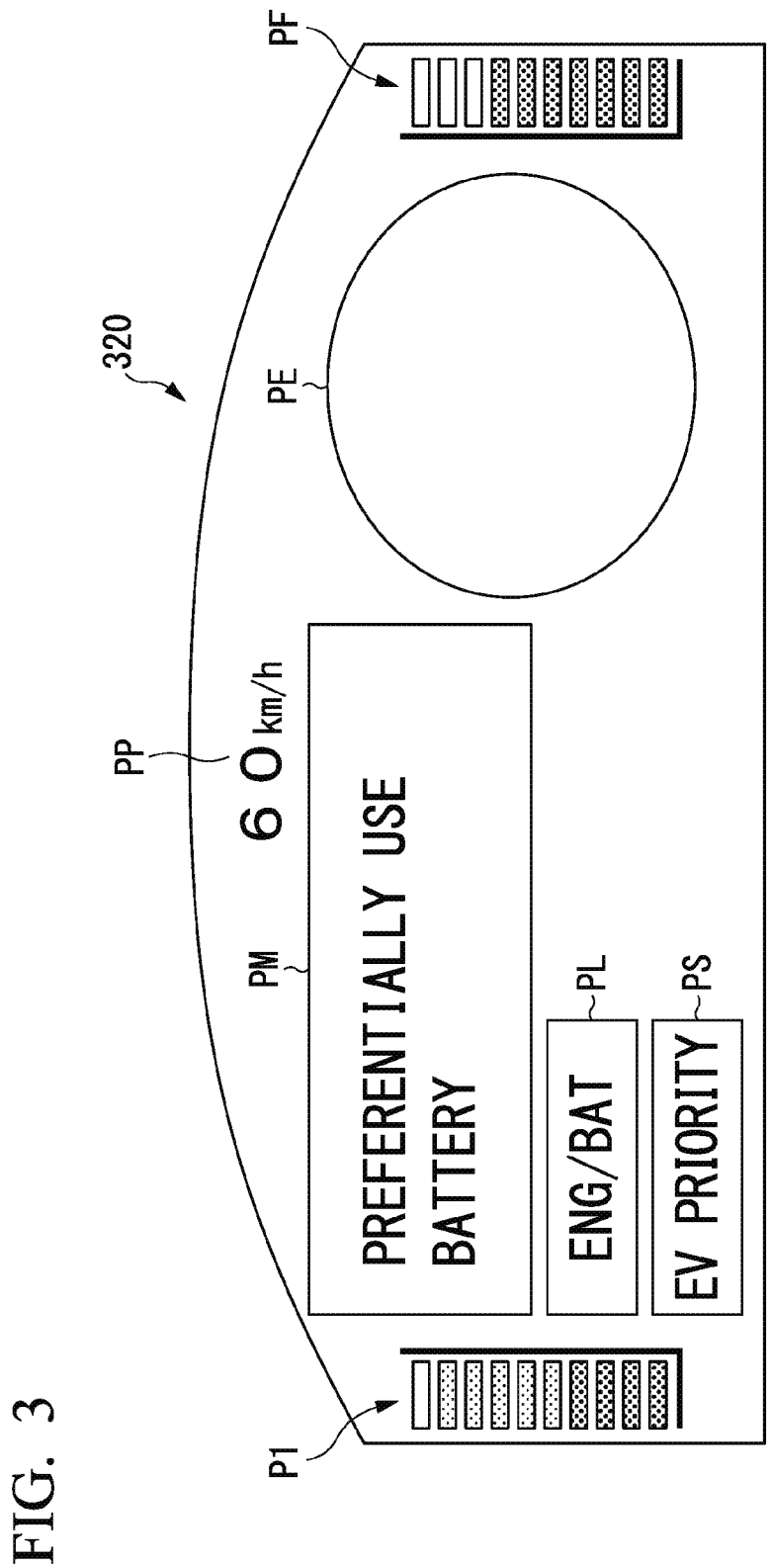
FIG. 3 is a diagram which shows an example of an image displayed on a display.

The display 320 is disposed, for example, in a meter panel portion including an instrument such as a vehicle speed meter provided in an instrument panel in front of a driver's seat of the vehicle. FIG. 3 is a diagram which shows an example of an image displayed on the display 320. As shown in FIG. 3, an SOC image P1 is displayed at a left end of the display 320. The traveling mode image PL and the selection mode image PS are vertically disposed side by side and displayed on a right side of the SOC image P1 in the display 320. In addition, the display 320 displays a message image PM, a digital vehicle speed image PP, a meter image PE, a fuel gauge image PF, and the like.

Figure 4:
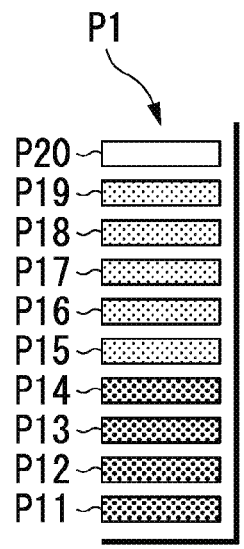
FIG. 4 is a diagram which shows an enlarged part of an example of a display of the display.

The SOC image P1 is an image of a graph in which the SOC of the battery 30 is displayed. The graph in which the SOC of the battery 30 is displayed is a bar graph-typed graph. As shown in FIG. 4, the SOC image P1 includes a plurality of, herein, ten, segment images, a first segment image P11 to a tenth segment image P20. The first segment image P11 to the tenth segment image P20 are vertically arranged and displayed. The first segment image P11 to the tenth segment image P20 are set as a bright display or a dark display on the basis of the SOC of the battery 30.

The display controller 310 causes the first segment image P11 to the tenth segment image P20 to be brightly displayed or darkly displayed in units of 10% to represent the SOC of the battery 30, respectively. For example, when the SOC of the battery 30 is 10%, the display controller 310 causes the first segment image P11 to be brightly displayed and causes a second segment image P12 to the tenth segment image P20 to be darkly displayed. From this state, the display controller 310 increases the number of segment images brightly displayed one by one from the bottom each time the SOC of the battery 30 increases by 10%, and the first segment image P11 to the tenth segment image P20 are all displayed brightly when the SOC of the battery 30 is 100%. In the examples shown in FIGS. 3 and 4, a state in which the SOC of the battery 30 is 90% is shown, the first segment image P11 to a ninth segment image P19 are brightly displayed, and the tenth segment image P20 is darkly displayed on the display 320.

The display controller 310 causes the display 320 to display an image in which the threshold value output by the determiner 240 is represented in a switching portion of a display form in the SOC image P1. The display controller 310 has different colors to be displayed in segment images PX above and below the switching portion of the display form of the SOC image P1 among segment images PX (X=11 to 20) brightly displayed. For example, when the SOC of the battery 30 is 90% and the threshold value output to the display system 300 by the determiner 240 is 40%, the display controller 310 brightly displays the first segment image P11 to the ninth segment image P19. Among the first segment image P11 to the ninth segment image P19 to be brightly displayed, the display controller 310 causes the first segment image P11 to a fourth segment image P14, each of which indicates an area equal to or less than the threshold value, to be displayed in red, and causes the fifth segment image P15 to the ninth segment image P19, each of which indicates an area exceeding the threshold value, to be displayed in green. The SOC image P1 is an image in which the SOC of the battery 30 and the threshold value used for determining whether the selection mode can be set to the electric power priority mode can be recognized. The SOC image P1 is an image that includes a threshold value image. The display controller 310 causes the display 320 to display the SOC image P1 regardless of whether there is an instruction to switch to the normal mode or the electric power priority mode by a driver operating the switching switch 400.

When the SOC output by the calculator 220 is smaller than the threshold value output by the determiner 240, the display controller 310 causes the brightly displayed segment images PX to be displayed all in the same color, for example, red. By displaying all the segment images PX in the same color of red, the driver is notified that the selection mode cannot be set to the electric power priority mode.

The traveling mode image PL is an image for notifying a traveling mode set in the HV vehicle 10, and is an image in which characters of "ENG" and "BAT" are separated by "/". The display controller 310 causes one of the characters "ENG" and "BAT" to be brightly displayed, the other to be darkly displayed, or the both to be brightly displayed in the traveling mode image PL.

The selection mode image PS is an image of a character of "EV priority". The display controller 310 causes the display 320 to brightly display the character of "EV priority" when the selection mode set in the HV vehicle 10 is the electric power priority mode, and to darkly display the characters of "EV priority" when the selection mode is the normal mode. The display controller 310 informs the driver that the selection mode of the HV vehicle 10 is the electric power priority mode by causing the display 320 to brightly display the characters of "EV priority."

The message image PM is an image that contains a message to be notified to the driver. The display controller 310 causes the display 320 to display the information notified to the driver as the message image PM. For example, the display controller 310 causes the display 320 to display the message image PM including characters indicating "use battery preferentially" when the electric power traveling mode is selected by the driver as the traveling mode of the HV vehicle 10 and the setting permission information is output by the determiner 240.

Figure 5:
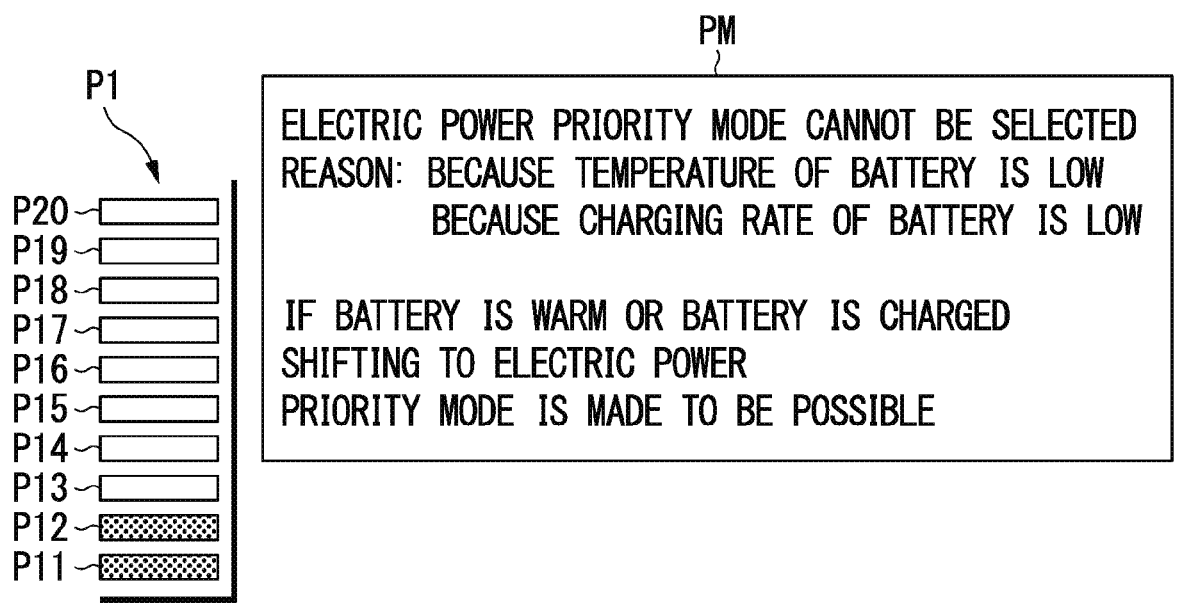
FIG. 5 is a diagram which shows an enlarged part of another example of the display of the display.

When the threshold value output by the determiner 240 is larger than the SOC output by the calculator 220, the display controller 310 may display all the segment images PX to be displayed brightly as shown in FIG. 5 in the same color, for example, red. In a case in which the determiner 240 determines that the electric power priority mode is not permitted, when the driver has selected the electric power priority mode, the display controller 310 causes the display 320 to display a character image (hereinafter, "reason image") indicating that selection mode cannot be set to the electric power priority mode and the reason as a message image PM. The display controller 310 displays the reason image for a certain display time and erases it after the display time has elapsed. Furthermore, the display controller 310 causes the display 320 to display a character image indicating a solution that enables setting to the electric power priority mode included in the message image PM.

The digital vehicle speed image PP is an image that shows a vehicle speed of the HV vehicle 10 using digital numbers. The meter image PE is an image that shows a state related to the internal combustion engine 12, for example, information on a rotation speed of the internal combustion engine 12, information on a temperature of cooling water (not shown), and the like. The fuel gauge image PF is an image which shows a remaining amount of fuel (gasoline) used for operating the internal combustion engine 12.

The switching switch 400 is a switch for shifting the selection mode between the electric power priority mode and the normal mode. The switching switch 400 is disposed, for example, at a position in the vicinity of the meter panel portion provided in the instrument panel and within a position which the driver can reach. If the switching switch 400 is operated, a switching instruction is output from the switching switch 400 to the vehicle system 100. The switcher 230 in the ECU 200 of the vehicle system 100 acquires the instruction of the driver, which indicates to switch the selection mode between the electric power priority mode and the normal mode when the switching instruction output by the switching switch 400 is input and acquired.

Figure 6:
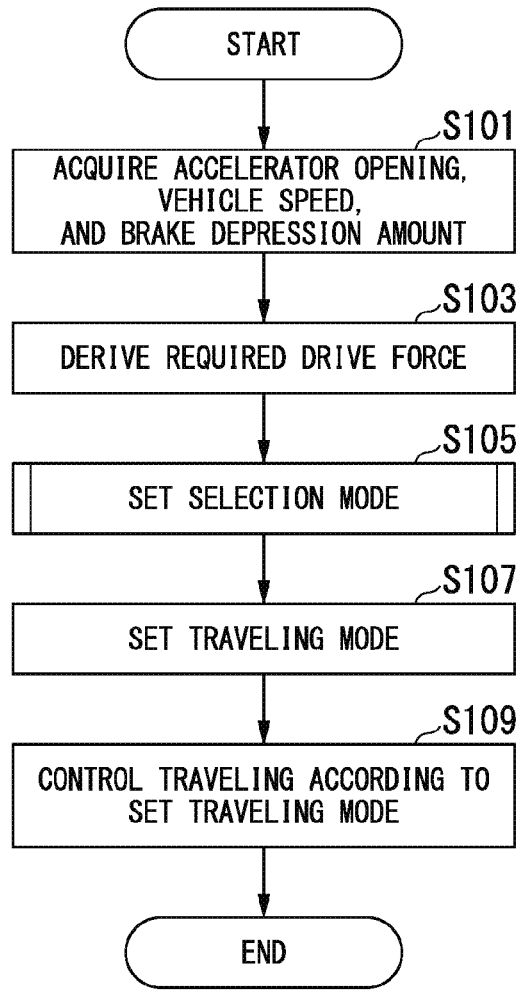
FIG. 6 is a flowchart which shows an example of a flow of processing executed in a vehicle system.

The HV vehicle 10 includes a charging port and a charging converter, which are not shown, and can be connected to a charger provided outside the HV vehicle 10 via a charging cable. The battery 30 provided in the HV vehicle 10 is capable of charging electricity supplied by a charger external to the HV vehicle 10. Electricity supplied by the charger outside the HV vehicle 10 is regulated by the charging converter. The HV vehicle 10 is a so-called plug-in hybrid vehicle that can be charged by an external charger Next, processing in the vehicle system 100 will be described. FIG. 6 is a flowchart which shows an example of a flow of processing executed in the vehicle system 100. The vehicle system 100 inputs and acquires an accelerator opening, a vehicle speed, and a brake depression amount of the HV vehicle 10, which are output by the vehicle sensor 40 in the deriver 210 of the ECU 200 (step S101). The deriver 210 derives a required drive force on the basis of the acquired accelerator opening, vehicle speed, and brake depression amount (step S103).

Figure 7:
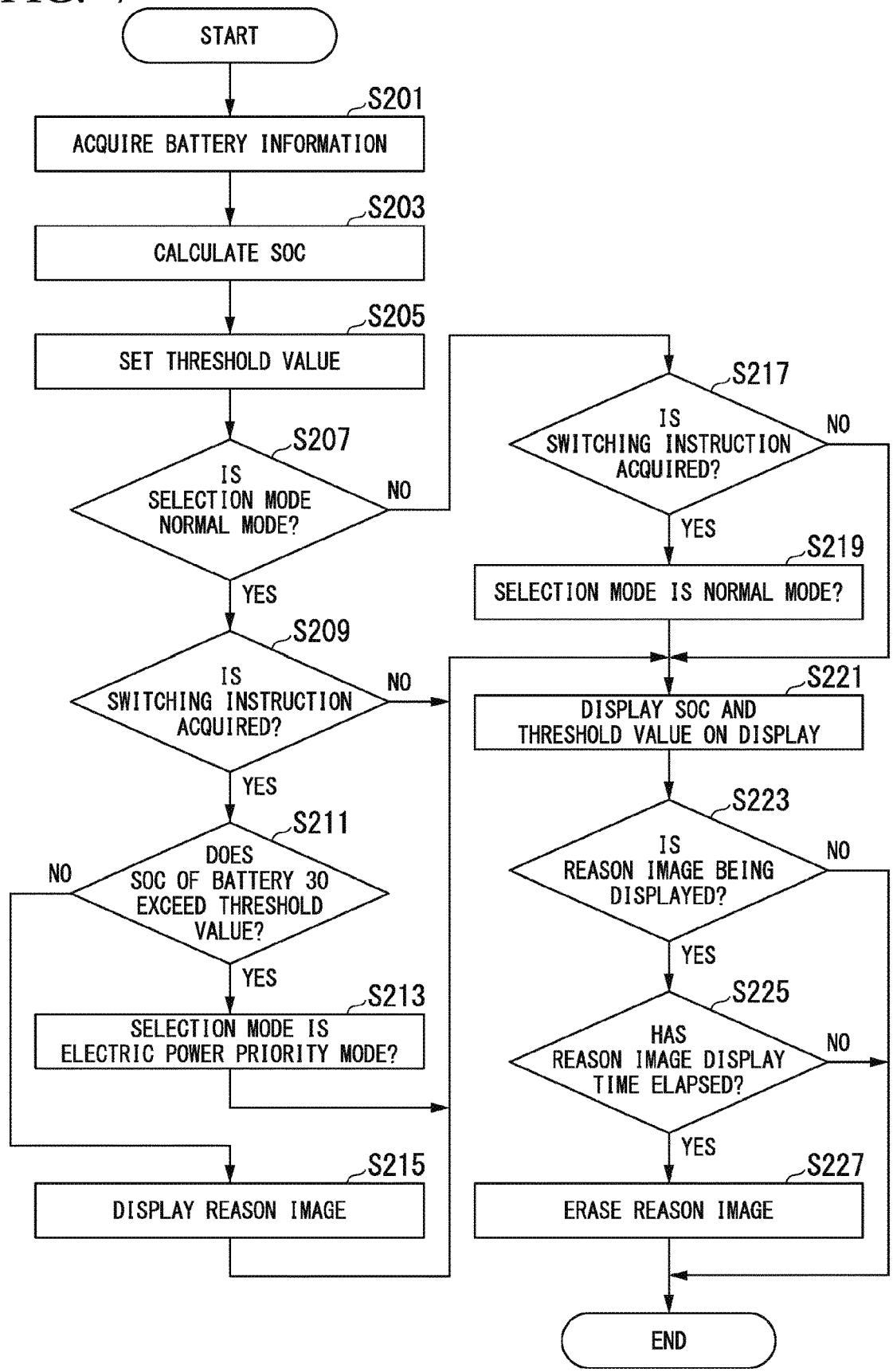
FIG. 7 is a flowchart which shows an example of the flow of the processing executed in the vehicle system.

Subsequently, the switcher 230 performs setting of the selection mode (step S105). Here, processing of setting the selection mode will be described with reference to FIG. 7. After the setting of the selection mode is performed, as shown in FIG. 7, the calculator 220 inputs and acquires battery information such as the current value, voltage value, and temperature of the battery 30, which are output by the battery sensor 42 (step S201).

Next, the calculator 220 calculates the SOC of the battery 30 on the basis of the acquired battery information of the battery 30 (step S203). Thereafter, the determiner 240 sets the threshold value of the SOC of the battery 30 so that the selection mode can be switched to the electric power priority mode (step S205). The determiner 240 refers to the temperature of the battery 30 included in the battery information, and adjusts the threshold value on the basis of the temperature of the battery 30 when the threshold value of the SOC of the battery 30 is set.

If the SOC of the battery 30 is less than a predetermined amount, it is difficult to supply a large amount of electric power from a viewpoint of performance deterioration. Even if the SOC of the battery 30 is equal to or more than the predetermined amount, when the temperature is low, it is also difficult to supply a large amount of electric power from the viewpoint of performance deterioration. For this reason, for example, an area in which the electric power traveling mode can be set is recognized in a relationship between the SOC and the temperature of the battery 30.

Figure 8:
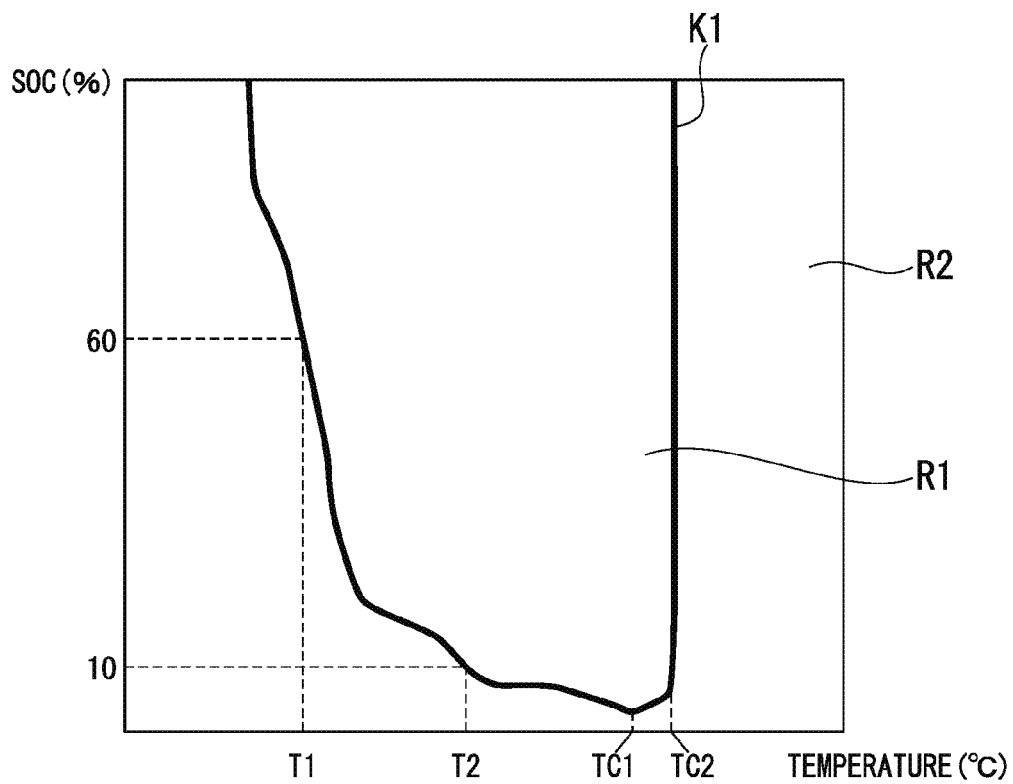
FIG. 8 is a diagram which shows an example of a relationship between a temperature and an SOC of a battery.

FIG. 8 is a diagram which shows an example of the relationship between the SOC and temperature of the battery 30. FIG. 8 shows an example of the area in which the electric power traveling mode can be set in the relationship between the SOC and the temperature of the battery 30. For example, the relationship between the SOC and the temperature of the battery 30 at which the selection mode can be switched to the electric power priority mode is assumed with the switching line K1 shown in FIG. 8 as a boundary. The switching line K1 has a shape in which the SOC of the battery 30 decreases as the temperature of the battery 30 increases if the temperature of the battery 30 is low, the SOC of the battery 30 also increases as the temperature of the battery 30 increases if the temperature of the battery 30 exceeds a first change temperature TC1, and the SOC of the battery 30 rises drastically if the temperature of the battery 30 exceeds a second change temperature TC2. The deterioration of the battery 30 is relatively small in a first area R1 inside the switching line K1, and is relatively large in a second area R2 outside the switching line K1. The first area R1 inside the switching line K1 is an area in which the temperature of the battery 30 with respect to the SOC of the battery 30 is larger than the relationship shown in the switching line K1 in an area where the temperature of the battery 30 is equal to or less than the first change temperature TC1, and is smaller than the relationship shown in the switching line K1 in an area where the temperature of the battery 30 exceeds the first change temperature TC1. The deterioration of the battery 30 tends to decrease away from the switching line K1 in the first area R1 inside the switching line K1, and increase away from the switching line K1 in the second area R2 outside the switching line K1.

For this reason, even if a large amount of electric power is supplied from the battery 30, the SOC of the battery 30 at which the deterioration of the battery 30 is relatively small varies depending on the temperature of the battery 30. In the case of FIG. 8, in the area equal to or less than the first change temperature TC1, for example, the temperature of the battery 30 when the threshold value of the SOC of the battery 30 is 60% is set to a first temperature T1, and the temperature of the battery 30 when the threshold value of the SOC of the battery 30 is 10% is set to a second temperature T2. In this case, the threshold value of the SOC of the battery 30 in a case where the temperature of the battery 30 is the second temperature T2 higher than the first temperature T1 is 10%, and is lower than 60% that is the threshold value of the SOC in a case where the temperature of the battery 30 is the first temperature T1. As described above, in the area equal to or less than the first change temperature TC1, the threshold value of the SOC of the battery 30 is low when the temperature of the battery 30 is high, but the threshold value of the SOC of the battery 30 is low when the temperature of the battery 30 is low in an area exceeding the first change temperature TC1 and equal to or less than the second change temperature TC2. For this reason, it is possible to set the threshold value of the SOC of the battery 30 such that the selection mode can be switched to the electric power priority mode on the basis of the temperature of the battery 30. In this case, in the area where the SOC of the battery 30 is low, for example, in an area where the SOC of the battery 30 is equal to or less than 10%, since the first area R1 exists only in a limited temperature range, the threshold value of the SOC of the battery 30 is rarely 10% or less. In the area exceeding the second change temperature TC2, since the area substantially becomes the second area R2 outside the switching line K1, the threshold value of the SOC of the battery 30 is set to 100%, and the selection mode is set to substantially not be switched to the electric power priority mode. In FIG. 8, the threshold value is set according to the relationship between the SOC and the temperature of the battery 30, but the threshold value may be set according to the relationship between the cooling water temperature and the SOC of the battery 30. Alternatively, the threshold value may be set according to the relationship between the SOC of battery 30 and the temperature and cooling water temperature of the battery 30.

Subsequently, the determiner 240 determines whether a current selection mode set in the HV vehicle 10 is the normal mode (step S207). As a selection mode when the HV vehicle 10 is started, the electric power priority mode or the normal mode is appropriately selected according to elements such as the SOC of the battery 30, the temperature of the battery 30, and a selection mode when the HV vehicle 10 was stopped. When it is determined that the selection mode is the normal mode, the switcher 230 determines whether a switching instruction that is output by the switching switch 400 for switching the selection mode from the normal mode to the electric power priority mode is acquired (step S209).

When it is determined that the switching instruction for switching the selection mode from the normal mode to the electric power priority mode is acquired, the determiner 240 determines whether the SOC of the battery 30 exceeds the threshold value (step S211). When it is determined that the SOC of the battery 30 exceeds the threshold value, the determiner 240 outputs setting permission information to the switcher 230. The switcher 230 switches the selection mode from the normal mode to the electric power priority mode on the basis of the setting permission information output by the determiner 240 (step S213), and proceeds to step S221.

When it is determined in step S209 that the switching instruction for switching the selection mode from the normal mode to the electric power priority mode is not acquired, the switcher 230 proceeds to step S221 as it is. In step S211, when the determiner 240 determines that the SOC of the battery 30 does not exceed the threshold value, switching to the electric power priority mode is not possible. In this case, the display controller 310 causes the display 320 to display the reason image (step S215), and proceeds to step S221.

When it is determined in step S207 that the selection mode is the electric power priority mode instead of the normal mode, the determiner 240 determines whether the switching instruction output by the switching switch 400 is acquired (step S217). When it is determined that the switching instruction output by the switching switch 400 is acquired, the determiner 240 switches the selection mode from the electric power priority mode to the normal mode (step S219), and proceeds to step S221. When it is determined that the switching instruction output by the switching switch 400 is not acquired, the determiner 240 proceeds to step S221 as it is.

Subsequently, the display controller 310 generates information for displaying the SOC image P1 on the basis of the SOC output by the calculator 220 and the threshold value output by the determiner 240, and causes the display 320 to display the SOC image P1 (step S221). The display controller 310 determines a segment image PX to be brightly displayed and a segment image PX to be darkly displayed among the SOC image P1 on the basis of the output SOC. The display controller 310 determines the color of the segment to be brightly displayed on the basis of the output threshold value.

Subsequently, the display controller 310 determines whether the reason image displayed in step S215 is being displayed (step S223). When it is determined that the reason image is not being displayed, the vehicle system 100 ends the processing shown in FIG. 7. When it is determined that the reason image is being displayed, the display controller 310 determines whether a certain display time has elapsed after displaying the image (step S225). When it is determined that the display time has not elapsed, the display controller 310 repeats the processing of step S225. When it is determined that the display time has elapsed, the display controller 310 erases the reason image (step S227), and the vehicle system 100 ends the processing shown in FIG. 7.

Returning to the flow shown in FIG. 6, the switcher 230 sets the traveling mode of the HV vehicle 10 on the basis of the current traveling mode of the HV vehicle 10, the required drive force calculated in step S103, and the selection mode set in step S105 (step S107). The switcher 230 sets the traveling mode to an engine operation traveling mode (a series traveling mode or an engine direct-coupled traveling mode) when, for example, the required drive force exceeds a predetermined first switching drive force. The switcher 230 sets the traveling mode to an electric power traveling mode when the required drive force exceeds a second switching drive force and is equal to or less than the first switching drive force and the selection mode is the electric power priority mode.

Subsequently, the controller 250 controls the internal combustion engine 12, clutch 18, the first inverter 34, and the second inverter 36 of the HV vehicle 10 on the basis of the required drive force calculated in step S105 and the traveling mode set in step S107 (step S109). In this manner, the vehicle system 100 ends the processing shown in FIG. 6.

The vehicle system 100 according to the embodiment sets the traveling mode of the HV vehicle 10 to the engine operation traveling mode in which traveling is performed by operating the internal combustion engine 12, and the electric power traveling mode in which traveling is performed by the first rotary electric machine 14. In the vehicle system 100, it is possible to switch between the normal mode and the electric power priority mode in which the electric power traveling by the electric power traveling mode is prioritized more than in the normal mode according to the instruction of the driver. The vehicle system 100 sets the threshold value of the SOC of the battery 30 that enables switching to the electric power priority mode, and enables switching to the electric power priority mode according to the instruction of the driver when the SOC of the battery 30 exceeds the threshold value. Here, in the vehicle system 100, the display controller 310 causes the display 320 to display the threshold value of the SOC of the battery 30 that enables switching to the electric power priority mode. The threshold value of the SOC of the battery 30 is adjusted on the basis of the temperature of the battery 30, and whether it is possible to switch to the electric power priority mode is determined on the basis of the SOC and the temperature of the battery 30. For this reason, since it is possible to notify the driver of whether switching to the appropriate electric power priority mode is possible, convenience for the driver can be improved.

Figure 9:
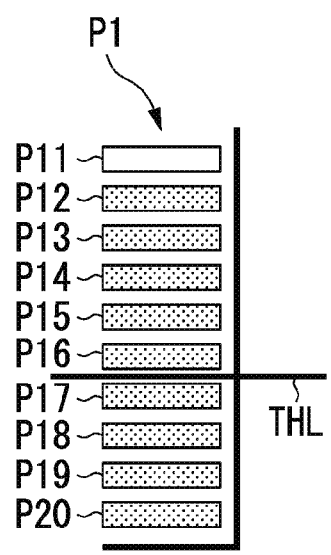
FIG. 9 is a diagram which shows a modified example of an SOC image.
Figure 10:
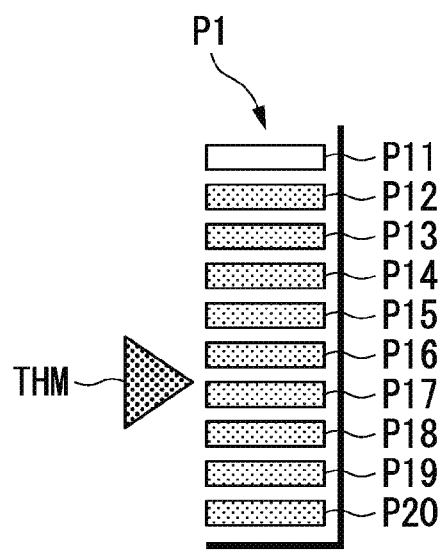
FIG. 10 is a diagram which shows another modified example of the SOC image.
Figure 11:
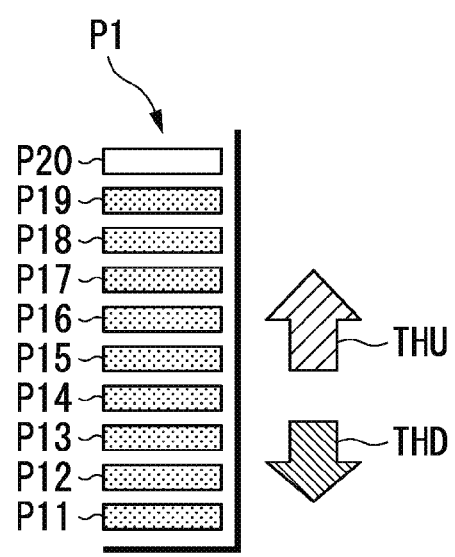
FIG. 11 is a diagram which shows another modified example of the SOC image.

Next, a modified example of the SOC image P1 will be described. FIGS. 9 to 11 are diagrams which show modified examples of the SOC image P1. In any of the modified examples of the SOC image P1 shown in FIGS. 9 to 11, a display of the first segment image P11 to the tenth segment image P20 is the same as that in the embodiment described above, but a display regarding the threshold value is different.

In the modified example shown in FIG. 9, the display controller 310 causes the display 320 to display the threshold value line THL based on the threshold value output by the determiner 240. The display controller 310 causes the threshold value line THL to be displayed at a position corresponding to the switching portion of the embodiment described above in the SOC image P1, in other words, at a position indicating the SOC that enables switching to the electric power priority mode. For this reason, when the switching to the electric power priority mode is possible, the brightly displayed segment image PX is above the threshold value line THL. If switching to the electric power priority mode is not possible, all segment images PX above the threshold value line THL will be darkly displayed, and the segment image PX above the threshold value line THL may be brightly displayed or darkly displayed.

In the modified example shown in FIG. 10, the display controller 310 causes the display 320 to display a threshold value arrow THM based on the threshold value output by the determiner 240. The display controller 310 causes the threshold value arrow THM that occupies a position corresponding to the switching portion of the embodiment described above in the SOC image P1 to be displayed.

In the modified example shown in FIG. 11, the display controller 310 causes the display 320 to display an upward arrow THU and a downward arrow THD based on the threshold value output by the determiner 240. With a position corresponding to the switching portion of the embodiment described above in the SOC image P1 as a boundary, the display controller 310 causes the upward arrow THU to be displayed above the position, and the downward arrow THD to be displayed below the position. With these displayed, it is possible to notify the driver of whether switching to the electric power priority mode is possible, and to improve convenience.

A graph showing the SOC image P1 is a bar graph in the embodiment described above, but it may be in other forms, for example, it may be a circle graph or a line graph. Displayed colors differ between segment images PX on an upper side and a lower side of the switching portion in the SOC image P1 in the embodiment described above, but another mode may also be adopted. For example, the segment image PX on the upper side of the switching portion may be highlighted and the segment image PX on the lower side may be displayed normally. In this manner, luminance and brightness of the segment images PX may be adjusted with the switching portion as a boundary. Alternatively, shapes and sizes of the segment images PX may be changed with the switching portion as a boundary.

Whether it is possible to switch to the electric power priority mode is determined on the basis of the SOC and the temperature of the battery 30 in the embodiment described above, but other elements may be used and referred to. For example, an indoor temperature, an outdoor temperature, or the like of the HV vehicle 10 shown in the embodiment may be used, or a load caused by an air conditioner or the like provided in the HV vehicle 10 may also be used. The cooling water temperature of the battery 30 may also be used. The temperature of the battery 30 may be estimated based on the cooling water temperature of the battery.

The threshold value used for determining whether the selection mode can be set to the electric power priority mode is adjusted on the basis of the temperature of the battery 30 in the embodiment described above, but the determination of whether switching to the electric power priority mode is possible may be performed in another form. For example, the relationship between the SOC and the temperature of the battery 30 and a result of determining whether it is possible to set to the electric power priority mode are made into a table without setting a threshold value and the like, and the determination of whether switching to the electric power priority mode is possible may be performed with reference to this table. Alternatively, an arithmetic expression that represents the result of determining whether it is possible to set to the electric power priority mode based on the relationship between the SOC and the temperature of the battery 30 may be set, and the determination of whether it is possible to switch to the electric power priority mode may be performed using this arithmetic expression. The HV vehicle 10 of the embodiment described above is a plug-in hybrid vehicle, but the HV vehicle 10 may be an electric vehicle that does not receive charging from the outside.

In the HV vehicle 10 of the embodiment described above, the electric power priority mode, like the normal mode, is specialized to shift from the electric power traveling mode to the engine operation traveling mode in accordance with an increase in required drive force, but may also be specialized not to shift. The HV vehicle 10 of the embodiment described above has the series traveling mode and the engine direct-coupled traveling mode as the engine operation traveling mode, but may include any one of them. In the HV vehicle 10 of the embodiment described above, it is assumed that the switching switch 400 performs the switching of a selection mode, but the HV vehicle 10 may have a voice recognition system that recognizes a voice of the driver and the switching of a selection mode may be performed according to the voice of the driver.

As described above, some embodiments for implementing the present invention have been described, but the present invention is not limited to these embodiments, and various modifications and substitutions can be made within a range not departing from the gist of the present invention.

What is claimed is:

1. A vehicle system mountable in a hybrid vehicle, which includes an internal combustion engine, a rotary electric machine connected to an axle, and a storage battery for supplying electric power for traveling to the rotary electric machine, comprising:
   a display;
   a determiner configured to, based on a State Of Charge (SOC) of the storage battery and at least one of a temperature of the storage battery or a cooling water temperature, determine whether a switch from a first mode to a second mode is possible, the first mode comprising electric power traveling of performing traveling by causing the rotary electric machine to drive only using electric power supplied by the storage battery without causing the internal combustion engine to operate shifted to engine operation traveling of performing traveling by causing the internal combustion engine to operate according to an increase of drive power, the second mode comprising the electric power traveling prioritized more than in the first mode;
   a switcher configured to switch between the first mode and the second mode on the basis of an instruction of a driver and a determination result of the determiner; and
   a display controller configured to cause the display to display an image regarding whether switching to the second mode is possible,
   wherein the determiner is further configured to determine whether the switch to the second mode is possible based on a threshold value set in advance for the SOC, and
   the display controller is further configured to cause the display to display an image in which the SOC of the storage battery and the threshold value can be recognized as the image regarding whether switching to the second mode is possible.

2. The vehicle system according to claim 1, wherein the display controller is configured to cause the display to display an image in which the threshold value is represented in a switching portion of a display form in a graph in which the SOC is displayed.

3. The vehicle system according to claim 1, wherein the determiner is configured to adjust the threshold value on the basis of at least one of a temperature of the storage battery or a cooling water temperature.

4. The vehicle system according to claim 1, wherein the determiner is configured to sequentially determine whether switching to the second mode is possible on the basis of an SOC of the storage battery and at least one of a temperature of the storage battery or a cooling water temperature.

5. The vehicle system according to claim 1, wherein the display controller is configured to cause the display to display the image regarding whether switching to the second mode is possible regardless of whether there is an instruction to switch to the second mode.

6. The vehicle system according to claim 1, wherein, in a case where switching to the second mode is not possible, the display controller is configured to cause the display to display an image indicating a reason why the switching is not possible.

7. The vehicle system according to claim 6,
wherein the display controller is configured to cause the display to display the image indicating a reason why the switching is not possible in a case where there is an instruction to switch to the second mode and switching to the second mode is not possible.

8. A hybrid vehicle in which the vehicle system according to claim 1, the internal combustion engine, the rotary electric machine connected to the axle, and the storage battery that is configured to supply electric power for traveling to the rotary electric machine are mounted.

* * * * *